(12) United States Patent  
Turk

(10) Patent No.: US 9,350,713 B2
(45) Date of Patent: May 24, 2016

(54) SYSTEM AND METHOD FOR ENCRYPTING TRAFFIC ON A NETWORK

(71) Applicant: BCE INC., Verdun (CA)

(72) Inventor: Doughan Turk, Mississauga (CA)

(73) Assignee: BCE INC., Montreal (CA)

( * ) Notice: Subject to any disclaimer, the term of this patent is extended or adjusted under 35 U.S.C. 154(b) by 24 days.

(21) Appl. No.: 14/063,655

(22) Filed: Oct. 25, 2013

(65) Prior Publication Data

US 2014/0331047 A1 Nov. 6, 2014

Related U.S. Application Data

(63) Continuation of application No. 13/304,362, filed on Nov. 24, 2011, now abandoned, which is a continuation of application No. 11/613,647, filed on Dec. 20, 2006, now abandoned.

(30) Foreign Application Priority Data

Dec. 23, 2005 (CA) ..................................... 2531411

(51) Int. Cl.
| | |
|---|---|
| H04L 9/16 | (2006.01) |
| H04L 29/06 | (2006.01) |
| H04L 9/08 | (2006.01) |
| H04L 9/12 | (2006.01) |
| H04L 12/24 | (2006.01) |

(52) U.S. Cl.
CPC .......... *H04L 63/0428* (2013.01); *H04L 9/0891* (2013.01); *H04L 9/12* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 4,405,829 | A | 9/1983 | Rivest et al. |
| 5,381,481 | A | 1/1995 | Gammie et al. |
| 5,963,646 | A | 10/1999 | Fielder et al. |
| 6,393,484 | B1 | 5/2002 | Massarani |
| 6,834,111 | B1 | 12/2004 | Nishimura et al. |
| 7,742,594 | B1 | 6/2010 | Loc et al. |
| 2002/0034300 | A1 | 3/2002 | Thuvesholmen et al. |
| 2002/0131595 | A1 | 9/2002 | Ueda et al. |
| 2004/0174997 | A1 | 9/2004 | Yamamichi et al. |

(Continued)

OTHER PUBLICATIONS

K.Mimura et al., Network Working Group, "Internet Fax Gateway Requirements", Internet-Draft: draft-ietf-fax-gateway-protocol-13. txt, Jan. 18, 2005, 13 pages, http://ietfreport.isoc.org/idref/draft-ietf-fax-gateway-protocol/, pages consulted on Mar. 23, 2007.

(Continued)

*Primary Examiner* — Michael R Vaughan
(74) *Attorney, Agent, or Firm* — Gowling Lafleur Henderson, LLP

(57) ABSTRACT

According to embodiments of the present invention a system and method for encrypting traffic on a network is disclosed. Encrypted data is transmitted between a first network element and a second network element by: acquiring an encryption seed at the first network element, the encryption seed being substantially similar to a decryption seed at the second network element; generating at least one encryption key from the encryption seed; receiving data; encrypting the data using the encryption key to generate encrypted data; transmitting the encrypted data from the first network element to the second network element via a network; and updating the encryption seed at the first network element in response to an event trigger.

14 Claims, 7 Drawing Sheets

(56) References Cited

U.S. PATENT DOCUMENTS

| | | |
|---|---|---|
| 2004/0177281 A1 | 9/2004 | Balaz et al. |
| 2004/0181696 A1 | 9/2004 | Walker |
| 2005/0094640 A1* | 5/2005 | Howe .................. 370/395.1 |
| 2008/0040274 A1 | 2/2008 | Uzo |
| 2010/0034383 A1 | 2/2010 | Turk |
| 2012/0288090 A1* | 11/2012 | Singhal .................. 380/46 |

OTHER PUBLICATIONS

RSA, The Security Division of EMC, "Software Authenticators", http://www.rsa.com/node.aspx?id=1313, pages consulted on May 3, 2007.

Jason Eaton, "Leading electronic payment solution provider enhances its transaction service utilizing RSA BSAFE technology", CyberSource Corporation, 2 pages, Copyright 2002.

Office Action mailed on Feb. 28, 2011 in connection with U.S. Appl. No. 11/613,647, 9 pages.

Office Action mailed on Jul. 26, 2011 in connection with U.S. Appl. No. 11/613,647, 10 pages.

Office Action mailed on Aug. 2, 2010 in connection with U.S. Appl. No. 11/613,647, 10 pages.

Office Action mailed on Oct. 10, 2012 in connection with U.S. Appl. No. 13/304,362, 8 pages.

Office Action mailed on Apr. 25, 2013 in connection with U.S. Appl. No. 13/304,362, 8 pages.

* cited by examiner

SYSTEM AND METHOD FOR ENCRYPTING TRAFFIC ON A NETWORK

CROSS-REFERENCE(S) TO RELATED APPLICATION(S)

This application is a CONTINUATION, claiming the benefit under 35 USC (§)120, of U.S. patent application Ser. No. 13/304,362 to Doughan Turk filed on Nov. 24, 2011, which is a CONTINUATION, claiming the benefit under 35 USC (§)120, of U.S. patent application Ser. No. 11/613,647 filed on Dec. 20, 2006, which claims priority to Canadian Patent application 2,531,411 filed on Dec. 23, 2005. The contents of the above noted applications are incorporated herein by reference.

FIELD OF THE INVENTION

This invention relates generally to communication networks and more specifically to a system and method for encrypting data on a network.

BACKGROUND OF THE INVENTION

Transmission of data through a communications network has become a commonplace activity in modern life and business. Indeed transmission of data through communications networks such as the public internet, or other packet-based communications networks, has become an activity that is a necessary part of most business structures, including transmission of data from PC's and laptops as well as transmission of data from business related network access devices such as customer service terminals and automated bank machines. Oftentimes the nature of the data being transmitted through the communications network from these devices can be of a sensitive nature, including business information, credit card or debit card numbers, including passwords, as well as personal financial information and the like.

In general, sensitive data will be encrypted prior to transmission through the communications network in a manner that is well known in the art: a pre-defined scheme is used to encrypt data at the originating device using an encryption key. The data is transmitted to a destination device where it is decrypted using a decryption key complementary to the encryption key. There are many methods for producing and exchanging the keys which are well known to those of skill in the art. One such encryption method is known as RSA, which is a public key encryption system widely used in electronic commercial protocols as disclosed in U.S. Pat. No. 4,405,829 by Rivest et al. and hereby incorporated by reference herein.

Encryption of data is often used in combination with a "tunnel" through a communications network, such as a virtual private network (VPN) or a permanent virtual circuit (PVC). In particular a VPN "tunnel" provides secure transmission of data through the communications network by encapsulating one protocol or data transfer session inside another. In a VPN, the message to be sent from the originating device to the destination device is encrypted at the originating device using an encryption scheme known by the destination device, for example an RSA encryption scheme. The encrypted message will include the data of interest, as well as data relevant to the transmission. Data relevant to the transmission can include header information, etc.

The encrypted message is then transmitted to the destination device, using methods well known to those of skill in the art. The destination device receives the message and subsequently decrypts it. After decryption, it appears to the destination device as if the decrypted message was sent directly to the destination device through the communications network, without encryption, using the original transmission data.

In one such scheme for establishing a VPN, an encryption key generator within a client at the originating location is provided with a seed. The encryption key generator uses the seed to generate a first encryption key. This is passed to an encrypting client, which uses the first encryption key to encrypt the data to be transmitted. A header is then attached to the encrypted data and the encrypted data is transmitted to the destination device, through the communication network, such as the public internet. The destination device has been pre-provisioned with a decryption key generator, as well as a seed complementary to the one provided to the encryption key generator; in general the encryption and decryption seeds are the same seed. The decryption key generator uses the seed to produce a first decryption key, complementary to the first encryption key, which is passed to a decrypting client at the destination, which in turn decrypts the encrypted data.

After a period of time, the first encryption key is passed to the input of the encryption key generator, in essence to be used as a new encryption seed, to produce a second encryption key. Again, after another period of time has elapsed, the second encryption key is passed to the input of the encryption key generator to produce a third encryption key. This process continues during the entire encryption session as a means to discourage unauthorized users from discovering the current encryption key and gaining access to the data. A similar process occurs at the destination location to generate a complementary decryption key each time a new encryption key is generated. A synchronization step may occur at the beginning of this process or further be synchronized by a common clock or pre-synchronized clocks, to ensure that the current decryption key is always complementary to the current encryption key.

Generation of the seed for the encryption key generator and the decryption key generator is crucial to this process. In the RSA scheme referred to previously, a user is provided with a seed generating device which provides a seed to the user, which is entered into the encryption key generator to begin the cycle of key generation. Often, the user will also enter a permanent password which is combined with the seed provided by the seed generating device to create a combined seed which is used to begin the cycle of key generation. While the seed generating device is often enabled to produce a seed periodically, for example every 60 seconds, the user uses only one seed for the entire session. To ensure that the generated decryption keys are complementary to the encryption keys, the decryption key generator must be provisioned with a seed generator synchronized with the user's seed generator, as well as the user's permanent password.

A common problem associated with this scheme is that if a malicious user understands the algorithm for generating keys, and can learn the original seed for the session, including the user's permanent password, used to generate the keys, or a key fed back into the key generator, it is possible to intercept the encrypted data on the communication network and decrypt it, hence compromising the integrity of the encrypted data. Hence there is a risk that providing a single seed for a session may not be adequate to fully protect the sensitive data in question. In particular, certain business institutions such as banks and brokerages may be particularly sensitive to the possibility of information being cracked by a malicious user.

There remains a need therefore for an improved system and method for encrypting data on a network.

SUMMARY OF THE INVENTION

The invention addresses at least one of the above stated needs and mitigates at least one of the stated problems.

A first broad aspect of the present invention seeks to provide a method for transmitting encrypted data between a first network element and a second network element. The first step of the method comprises acquiring an encryption seed at the first network element, the encryption seed being substantially similar to a decryption seed at the second network element. The second step of the method comprises generating at least one encryption key from the encryption seed. The third step of the method comprises receiving data. The fourth step of the method comprises encrypting the data using the encryption key to generate encrypted data. The fifth step of the method comprises transmitting the encrypted data from the first network element to the second network element via a network. The sixth step of the method comprises updating the encryption seed at the first network element in response to an event trigger.

In some embodiments of the first broad aspect, the event trigger comprises a first event trigger, and the method further comprises updating the encryption seed in response to a second event trigger. Further in these embodiments a period between the first and second event triggers is less than the period required to derive one of the encryption seed and the at least one encryption key from the encrypted data.

In some embodiments of the first broad aspect, the event trigger is the receipt of an updated encryption seed.

A second broad aspect of the present invention seeks to provide a method for transmitting encrypted data between a first network element and a second network element. The first step of the method comprises acquiring an encryption seed at the first network element, the encryption seed being substantially similar to a decryption seed at the second network element. The second step of the method comprises generating at least one encryption key from the encryption seed. The third step of the method comprises receiving data. The fourth step of the method comprises encrypting the data using said encryption key to generate encrypted data. The fifth step of the method comprises transmitting the encrypted data from the first network element to the second network element via a network. The sixth step of the method comprises updating the encryption seed at the first network element in response to an event trigger. Further the acquiring an encryption seed at the first network element, and the updating the encryption seed at the first network element in response to an event trigger occurs during a single data session.

In some embodiments of the second broad aspect updating the encryption seed at the first network element in response to an event trigger comprises acquiring an updated encryption seed.

A third broad aspect of the present invention seeks to provide a system for encrypting data for transmission from a computing apparatus to a destination network element via a network. The system includes an encryption seed generation apparatus enabled to: generate an encryption seed, the encryption seed being substantially similar to a decryption seed at the destination network element; transmit the encryption seed to the computing apparatus; and generate an updated encryption seed and transmit the updated encryption seed to the computing apparatus. The system further includes a computing apparatus coupled to the network and the encryption seed generation apparatus, the computing apparatus enabled to: receive an encryption seed; generate at least one encryption key from the encryption seed; receive data; encrypt the data using the encryption key to generate encrypted data; transmit the encrypted data from the computing apparatus to the destination network element via a network; and update the encryption seed with the updated encryption seed in response to an event trigger. Further in this embodiment, a period between the receipt of the encryption seed and the updating the encryption seed is less than the period required to derive one of the encryption seed and the at least one encryption key from the encrypted data.

In some embodiments of the third broad aspect the event trigger is the receipt of an updated encryption seed.

In other embodiments of the third broad aspect the event trigger is the receipt of a defined quantity of the data.

In further embodiments of the third broad aspect the event trigger is the receipt of a signal from a synchronization entity, the entity coupled to the network and the computing apparatus.

In some embodiments of the third broad aspect the event trigger comprises a first event trigger, wherein the system further comprises updating the encryption seed in response to a second event trigger.

In other embodiments of the third broad aspect the event trigger is the receipt of an updated encryption seed.

BRIEF DESCRIPTION OF THE DRAWINGS

Embodiments of the present invention are described with reference to the following figures, in which.

DETAILED DESCRIPTION OF THE PRESENT INVENTION

Figure 1A:
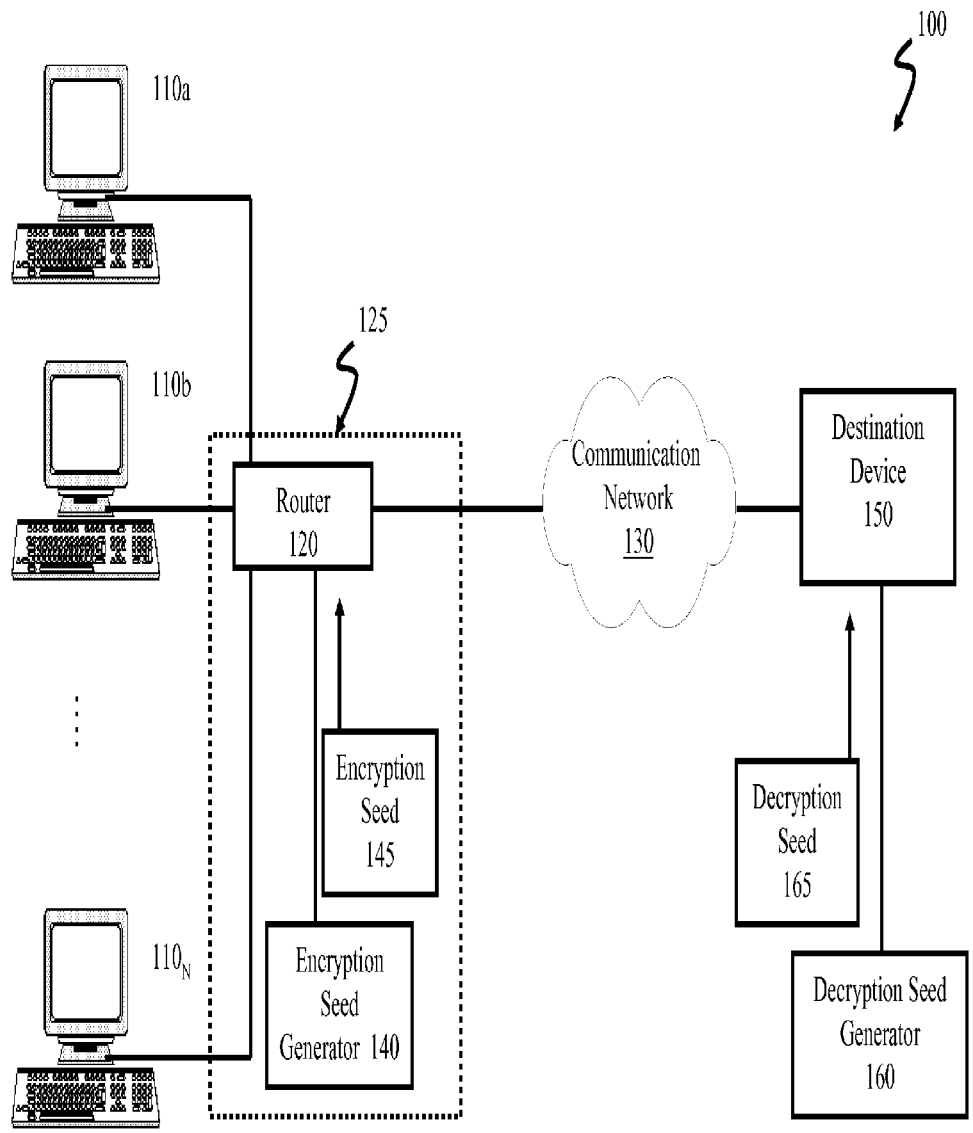
FIG. 1a is a block diagram illustrating a system for encrypting data on a network according to one embodiment of the present invention.

FIG. 1a depicts a system 100 for encrypting data on a network according to an embodiment of the present invention. The system 100 comprises at least one originating communications device 110 in communication with a router 120, which is further in communication with a communications network 130. The at least one originating communications device 110 may comprise a computing device equipped with a processor, a memory and an input/output interface (I/O). System 100 may include a plurality of N originating communications devices 110, labelled 110a, 110b, 110$_N$ in FIG. 1a. Communications device 110 may include personal computers and the like, as well as other network access devices such as customer service terminals, automated bank machines (ABMs) and the like.

In some embodiments, each communications device 110 is in wireline communication with router 120, using cabling such as twisted pair or coaxial cables and the like; in further embodiments one or more communications device 110 are in wireless communication with router 120. In embodiments where wireless communication is employed, both communication device 110 and router 120 communicate wirelessly using protocols such as Wi-Fi, WiMax and the like. Further, suitable encryption schemes may be employed to ensure secure transfer of data between the communications device 110 and the router 120, the encryption schemes being independent of further encryption schemes described below.

Router 120 may comprise any commercially available router, such as one manufactured and distributed by Cisco Systems, Inc. of 170 West Tasman Dr., San Jose, Calif. 95134, USA, enabled to accept data from at least one communications device 110, and to accept input from encryption seed generator 140, including an encryption seed 145 generated by encryption seed generator 140.

Figure 1B:
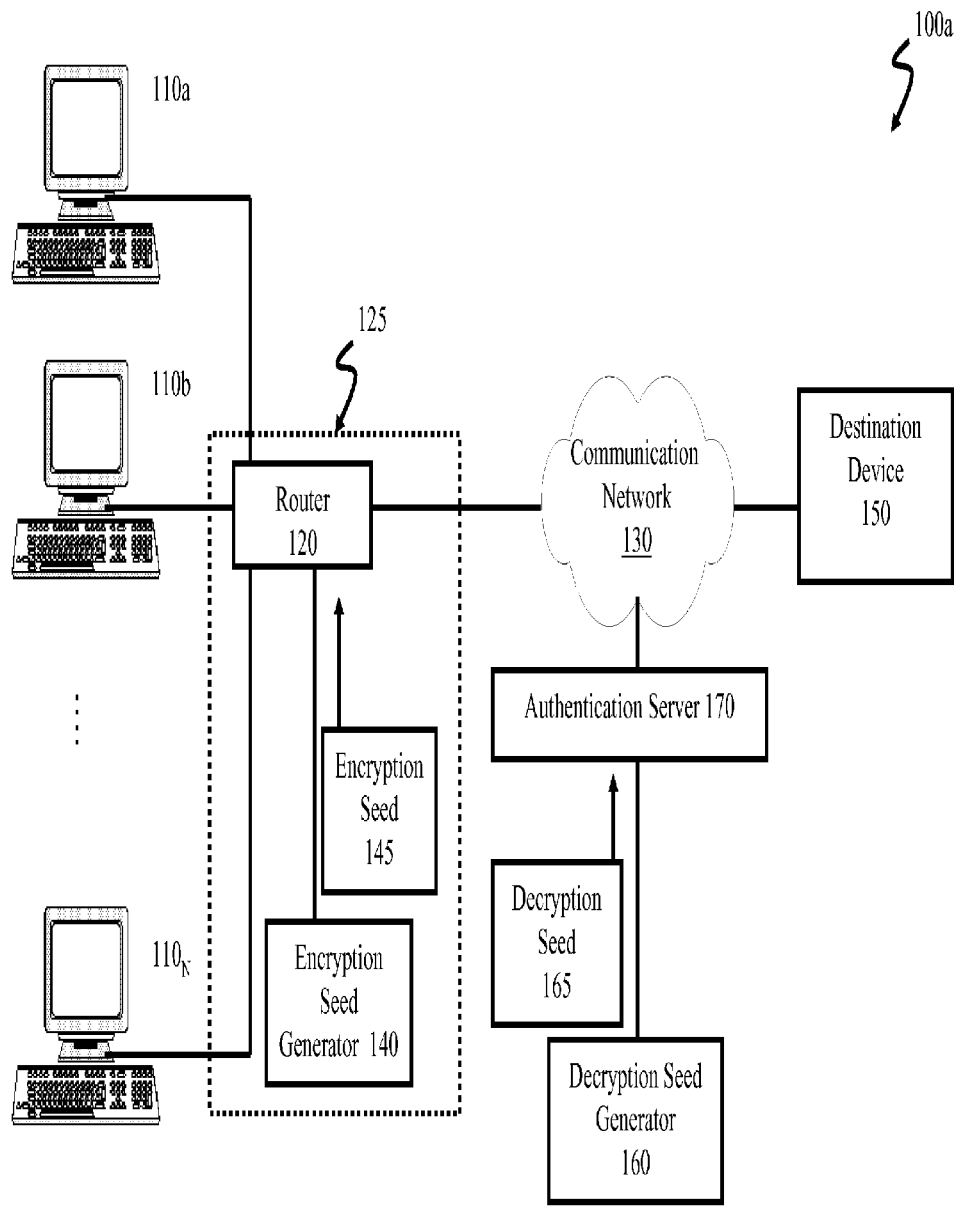
FIG. 1b is a block diagram illustrating a system for encrypting data on a network according to one embodiment of the present invention.
Figure 1C:
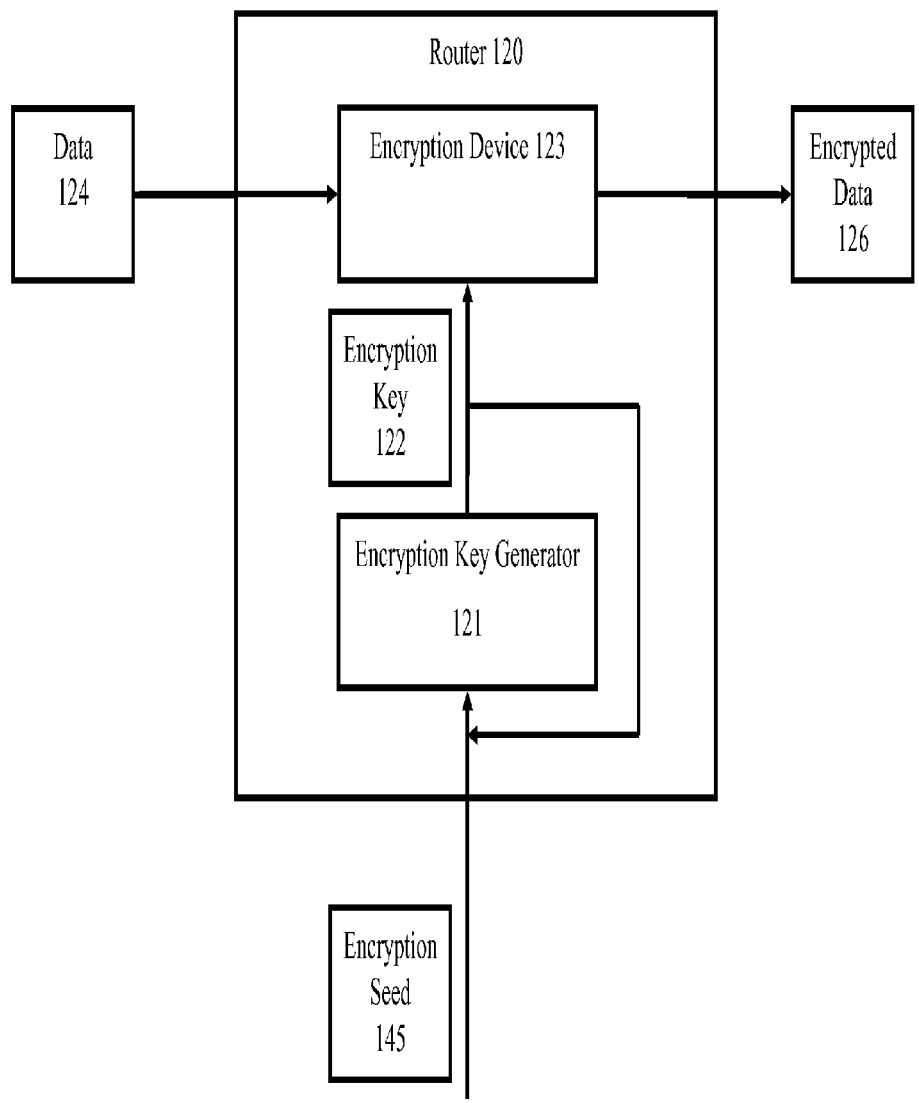
FIG. 1c is block diagram illustrating components of a router deployed in the system for encrypting data on a network according to one embodiment of the present invention.

Details of router 120 in one embodiment of the present invention are depicted in FIG. 1c. Key generator 121 accepts encryption seed 145. Key generator uses encryption seed 145 to generate encryption key 122. Encryption key 122 passed to encryption device 123, which further accepts data 124 from communications device 110. The encryption device uses encryption key 122 to encrypt the data 124, resulting in encrypted data 126, which is then transmitted to communications network 130. Key generator 121 is further enabled to pass encryption key 122 to the input of key generator 121, which then uses the encryption key 122 as a new seed to generate a new encryption key 122; this process typically occurs on a periodic basis.

In a further embodiment of the present invention key generator 121 is located in combination with encryption seed generator 140. Within this embodiment router 120 is enabled to accept encryption key 122 periodically and further enabled to pass encryption key 122 back to encryption key generator 121, to act as a new seed in the production of a new encryption key 122. In yet further embodiments, encryption device 123 may be located at computing device 110; within this embodiment router 120 is enabled to pass encryption key 122 to communication device 110. Once the encryption key 122 is received by communications device 110, encryption device 123 encrypts data 124 and passes the encrypted data 126 back to router 120 for transmission to communications network 130. Various other combinations may occur to those with skill in the art and are within the scope of the present invention.

Router 120 and encryption seed generator 140 are protected by a secure barrier 125 which limits physical access to router 120 and encryption seed generator 140. Secure barrier 125 may be a locked room, a locked box and the like, containing Router 120 and encryption seed generator 140, and which allows only authorized users access to the elements inside secure barrier 125. In one embodiment secure barrier 125 is also provided with a secure access system such as a key, or password enabled access, such as an electronic access system, or a combination of these. Other means of secure access may occur to those of skill in the art. Secure barrier 125 should also be constructed in a sufficiently rugged manner to deter a non-authorized user from breaking into it. As a non-limiting example, secure bather 125 may be constructed of high security, thick steel walls, similar to those materials used in constructing a vault, for example. The combination of a secure access system coupled with rugged construction prevents non-authorized users from gaining access to the router 120 and encryption seed generator 140, and prevents non-authorized users from obtaining sufficient information to learn details of encryption seed 145.

In some embodiments of the present invention, the router 120 is incorporated directly into one of a plurality of communications devices 110. In these embodiments, the plurality of communications devices 110a, 110b, 110N are in communication with the communication devices 110 incorporating the router 120 and through which all data from the remaining communications devices pass.

The encryption seed generator 140 may be a logical encryption seed generator, resident in router 120 or one of the communications devices 110, or a hardware based encryption seed generator implemented within a separate computing apparatus enabled to generate a plurality of encryption seeds 145 and to communicate with router 120. Encryption seed generator 140 may be further equipped with an internal clock, and enabled to generate a new encryption seed periodically, for example every 60 seconds. In a non-limiting example, encryption seed generator 140 may be a commercially available encryption seed generator, such as RSA SecureID® USB Token manufactured and distributed by RSA Security of 174 & 176 Middlesex Turnpike, Bedford, Mass. 01730.

In embodiments of the present invention encryption seed generator 140 generates an encryption seed 145 to initialize the production of encryption keys in an encryption key generator. The encryption seed generator 140 may use at least one encryption seed generation scheme. One such example of an encryption seed generation scheme is an RSA encryption seed generation scheme wherein a private numerical code is used to generate at least one encryption seed 145. In such an encryption scheme, the encryption seed generator 140 is provided with a pre-equipped random number, as well as method for generating a new encryption seed 145 periodically, for example every 60 seconds, according to the internal clock, or alternatively, synchronized with an external clock. In one encryption seed generation scheme, the time is combined with the code and an algorithm to create the encryption seed 145. In an alternative embodiment the counter number from an event counter may be combined with the code and an algorithm to create the encryption seed 145. Thus using the code, and least one other factor generated periodically, encryption seed generator 140 generates an encryption seed 145 according to a method described in U.S. Pat. No. 4,405,829 by Rivest et al. Though the generation of encryption seed 145 is described with reference to an RSA scheme, alternative encryption schemes may be used including the ElGamal algorithm, DSA and elliptic curve cryptography, or other encryption schemes well known to those of skill in the art.

Communications network 130 may comprise any network which allows for transmission of data from an originating communications device to a destination communications device. Specific non-limiting examples include: the PSTN, including PBX and Centrex networks; and packet switched networks such as the internet, or an intranet such as a LAN or a WAN. The communications network 130 could be based on a variety of protocols including, but not limited to internet protocol (IP) or asynchronous transfer mode (ATM) protocol. In some embodiments, portions of communications network 130 may be enabled to transfer data using a first protocol, whereas further portions can transfer data using another additional protocol; in these embodiments the communications network 130 will include an apparatus to translate transmitted data between each protocol.

As depicted in FIG. 1a, communications network 130 is in further communication with a destination device 150 which can accept data transmitted from the communications network 130. The destination device 150 may comprise a computing device equipped with a processor, a memory and an input/output interface (I/O). In some embodiments the destination device 150 may comprise a personal computers and the like, while in further embodiments the destination device is a network servers and the like. In a non-limiting example destination device 150 may be a server which accepts financial data, such as financial transactions, from at least one originating data device 110, such as an automated bank machine. In this example, destination device 150 may accept the financial data from the automated bank machine and further process the financial data, or alternatively act as a gateway to a larger system for processing financial data and transaction. Other examples of destination device 150 may occur to those of skill in the art.

Destination device 150 is coupled with a decryption seed generator 160, adapted to generate at least one decryption seed 165, complementary to at least one encryption seed 145. The decryption seed 165 allows a device receiving data which has been encrypted using encryption keys generated from encryption seed 145 to be decrypted. In such a scheme, data is encrypted at an originating device, such as originating communications device 110, or router 120, using the encryption seed 145, as a starting point for encryption key generation. The data is transmitted to the destination device 150 where the encrypted data may be decrypted using decryption keys generated from decryption seed 165, in a manner known to those of skill in the art. Decryption seed generator 160 is further enabled to generate decryption key 165 periodically in a manner similar to the method used encryption seed generator 140 to generate encryption seed 145. In some embodiments a secure barrier (not shown) similar to secure barrier 125 may be placed around encryption seed generator 160 and destination device 150 to prevent unauthorized users from gaining physical access to the system.

Decryption seed generator 160 is further synchronized with encryption seed generator 140 such that when encryption seed generator 140 generates encryption seed 145, decryption seed generator 160 is enabled to generate a decryption seed 165 complementary to encryption seed 145. Decryption seed generator 160 is enabled to generate a new decryption seed 165 periodically, for example every 60 seconds, in synchronization with encryption seed generator 140. Encryption seed generator 140 and decryption seed generator 160 are synchronized with respect to time, each further equipped with an internal clock which have been synchronized to each other.

In alternative embodiments, encryption key generator 140 and decryption key generator 160 may exchange synchronization data to allow for said synchronization. The exchange of synchronization data may occur via communication network 130, or alternatively could occur via a second communications network (not pictured), such as a wireless network, a backhaul network, or a secure network. In yet another embodiment synchronization data may be exchanged via a seed management entity which may be located at the router 120, encryption key generator 140, the originating communications device 110, the destination device 150, or at a separate network element in communication with communication network 130.

Decryption seed generator 160 may generate a decryption seed 165 in a manner similar to the generation of encryption seed 145. Continuing with the example of RSA encryption schemes, the decryption seed generator 160 is provided with the same code as the encryption seed generator 140, and uses the same method for generating a new encryption seed periodically, for example every 60 seconds according to the synchronized internal clock. In one encryption seed generation scheme, the time is combined with the code and an encryption algorithm to create the decryption seed 165 which is similar to encryption seed 145, the clock at the decryption seed generator 160 being synchronized with the clock at the encryption seed generator 140.

Decryption seed generator 160 may be a logical decryption seed generator, resident in destination device 150 or a hardware based decryption seed generator implemented within a separate computing apparatus enabled to generate a plurality of decryption seeds 165 and to communicate with destination device 150. Decryption seed generator 160 may be further equipped with an internal clock, and enabled to generate a new encryption key periodically, for example every 60 seconds. In a non-limiting example, decryption seed generator 150 may be a commercially available seed generator, such as RSA SecureID® USB Token manufactured and distributed by RSA Security of 174 & 176 Middlesex Turnpike, Bedford, Mass. 01730.

In an alternative embodiment, destination device 150 may be in communication with a plurality of originating communications devices, for example at different geographic locations, with each geographic grouping of originating communications devices coupled to communication network 130 using a separate router 120 local to each location, or local to each originating communications device 110. In this embodiment each router may be equipped with a separate encryption seed generator 140 each of which may be assigned a different starting numerical code. Alternatively a single encryption seed generator 140 may be in communication with the various routers; the encryption seed generator 140 may be enabled to generate multiple encryption seeds from multiple starting numeric codes and to further securely transmit the relevant encryption seed to the relevant router. The generation of the encryption seeds may occur sequentially via a single encryption seed generator logic, or in parallel using a plurality of encryption seed generator logics. In this alternative the encryption seed generator 140 may be further equipped with an encryption seed management logic to ensure that the various encryption seeds are sent to the relevant routers. Further the secure transmission of the seeds may occur using a variety of techniques known to those of skill in the art.

In these embodiments, decryption seed generator 160 is enabled to generate a plurality of decryption seeds 165, using a plurality of codes, such that destination device 150 may receive and decrypt data from a plurality of originating data devices. In this embodiment the decryption seed generator 160 may be enabled to generate multiple decryption seeds 165 from multiple starting numeric codes, the generation of decryption seeds 165 being synchronized with the encryption seeds 145 being generated at encryption seed generator 140, and further complementing the encryption seeds 145 being generated at encryption seed generator 140. The generation of the decryption seeds 165 may occur sequentially via a single decryption seed generator logic, or in parallel using a plurality of decryption seed generator logics. The decryption seed generator 160 may be further equipped with decryption seed management logic to ensure accurate communication of the various decryption seeds to the destination device 150. In yet another alternative embodiment the decryption seed generator may reside as a logical decryption seed generator on destination device 150.

Further in these embodiments destination device 150 may be enabled to accept a plurality of decryption seeds 165 from decryption seed generator 160, and may be further enabled to generate a plurality of decryption keys from the decryption seeds 165 to decrypt encrypted data arriving from the various routers. The decryption keys may be generated sequentially by a single decryption key generator or in parallel by a plurality of decryption key generators. Destination device 150 may be further equipped with a decryption key management logic to ensure that the decryption keys are being generated to synchronize with the encryption keys generated at the various routers 120, and to further ensure that the correct decryption key is being used to decrypt data arriving from a particular router. The decryption key management logic may be further enabled to manage the decryption seeds being input into the decryption key generator or generators As depicted in FIG. 1b, in some embodiments system 100 may include an authentication server 170 in communication with communication network 130. Authentication server 170 is enabled to authenticate and authorize a user for access to communication network 130. Authentication server may be further enabled to authenticate and authorize a user for access to destination communications device 150. In embodiments which include an authentication server 170, decryption seed generator 160 may alternately be in communication with authentication server 170, authentication server 170 being further enabled to deliver a decryption seed 165 to destination device 150 as a starting point for decryption key generation by a decryption key generator. Authentication Server 170 may comprise a commercially available AAA server such as a RADIUS server manufactured and distributed by Bridgewater Systems of 303 Terry Fox Drive, Suite 100 Ottawa, Ontario Canada K2K 3JI. In some embodiments a secure barrier (not shown) similar to secure barrier 125 may be placed around decryption seed generator 160 and authentication server 170 to prevent un-authorize users from gaining physical access to the system.

A method 200 for encrypting data on a network, according to an embodiment of the present invention, will now be described with reference to FIG. 2. In order to assist in the explanation of the method, it will be assumed that method 200 is operated using system 100 of FIG. 1a. Furthermore, the following discussion of method 200 will lead to further understanding of system 100 and its various components. It should be understood that the steps in method 200 need not be performed in the sequence shown. Further, it is to be understood that system 100 and/or method 200 can be varied, and need not work as discussed herein in conjunction with each other, and that such variations are within the scope of the present invention.

By way of illustration only, method 200 will be described, when appropriate, using the non-limiting example of the method being executable within router 120. It should be understood, however, that method 200 may be equally executable within at least one of originating communications devices 110a, 110b, 110N. At step 202 a data transmission session is initiated between the router 120 and the destination device 150. Such session initiation is well known to one of skill in the art and may involve a series of handshaking steps to establish communications.

At step 203 a one time password is received. The one time password is a fixed numerical code or password which is known to both router 120 and destination device 150. The exchange of the one time password is implemented prior to the session initiation. The one time password may be specific to router 120, or specific to each of originating computing devices 110a, 110b, ... 110$_N$. Alternatively, each originating computing device may share the same one time password. The one time password may be already resident on router 120 and stored in memory, or may be received from at least one originating computing device 110. In further embodiments the one time password may be omitted.

At step 204 an encryption seed 145 is received from encryption seed generator 140. The encryption seed 145 enables an encryption key generator to initialize the production of encryption keys. In some embodiments, at step 206, a check is made to ensure that the encryption seed received at step 204 is synchronized with the decryption seed 165 generated by decryption seed generator 160, intended to initialize production of decryption keys, the decryption seed 165 received at destination device 150. This may comprise sending an encrypted test message to destination device 150, via communication network 130, the message encrypted by an encryption key generated from the encryption seed 145, and receiving confirmation of successful decryption of said test message, also via communication network 130, the decryption occurring using a decryption key generated from the complementary decryption seed 165. Alternatively the encrypted test message and confirmation message may be transmitted on a second communication network (not depicted) if router 120 and destination device 150 are also coupled to the second communication network. If confirmation of successful decryption is not received, then resynchronization may need to occur, and a message may be sent to the administrator of the router 120. Alternatively this step may be performed elsewhere in the method using data received from the originating communications device 110 as the test message. In yet another embodiment, this step may be omitted, with the various components assuming a synchronization scheme already to be in place. As a non-limiting example pre-synchronized internal clocks within the encryption seed generator 140 and the decryption seed generator 160 could be utilized.

At step 220 the encryption seed 145 and the one time password received at step 203 are combined into a combined encryption seed, which is used to generate an encryption key to encrypt data received from originating communications device 110, prior to transmission to destination communications device 150. It is understood that encryption key 204 will be used in conjunction with an encryption scheme resident on router 120. In embodiments where a one time password is not used, this step may be omitted. In some embodiments the one time password may be used only to authenticate communications device 150, or a user of system 100, to router 120. In these embodiments, step 220 may also be omitted.

At step 222 an encryption key is generated using the combined seed, generated at step 220. Alternatively the encryption key may be generated using only the encryption seed 145 generated at step 204 and the one time password is used for initial authentication purposes only. The encryption key is generated using a suitable algorithm; it is understood that such algorithms typically incorporate functions in which it is difficult to calculate the encryption seed input to the function given the encryption key output. Non-limiting examples of such algorithms include the RSA algorithm, the ElGamal algorithm, DSA and elliptic curve cryptography. However other algorithms for generating encryption keys will occur to those of skill in the art.

At step 208, data to be transmitted to destination device 150 is received from originating communications device 110. At step 210 the data is encrypted using the encryption key generated by key generator 140. The encryption is performed using, for example, an RSA encryption scheme; however other encryption schemes may be used. At step 212 the encrypted data is transmitted to destination device 150 via communication network 130.

After transmission of the encrypted data, router 120 may determine if the session is to continue. In one embodiment router 120 may query communications device 110 to determine if more data is to be transmitted. If no more data is to be transmitted then the session is terminated at step 216.

However, if more data is to be transmitted then, at step 224, a determination is made as to whether or not a new encryption key is to be generated. In one embodiment a new encryption key is generated periodically, for example every 60 seconds. This embodiment may include a synchronization step, to ensure that the new encryption key is synchronized with a new decryption key at the destination device 150. The synchronization may occur via a pre-synchronized process on both the router 120 and the destination device 150, in which encryption key and complementary decryption keys are generated periodically, for example every 60 seconds. Alternatively a synchronization message may be exchanged between router 120 and destination device 150 either via communication network 130 or a second communication network (not shown). In yet another alternative destination device 150 may store the current decryption key as well as a number of previous keys, and may even generate and store a number of expected future decryption keys; if encrypted data received cannot be decrypted by the expected current decryption key, the destination device may test the success of decrypting the encrypted data using a number of previous and future keys to determine if resynchronization needs to occur. The resynchronization can be automatic, with the decryption key that successfully decrypts the encrypted data becoming the current decryption key, or a handshaking step may occur between destination device 150 and router 120 in order to resynchronize the production of the encryption and decryption keys, and to re-authenticate the communication between the two devices. If no decryption key located at destination device 150 is successful at decrypting the data, either a resynchronization step may occur or, alternatively, a message may be sent to an administrator informing the administrator of the problem; indeed this may signal a breach in security or may indicate the need to repair equipment.

However, in further embodiments, criteria other than periodic production may be used to determine whether a new encryption key should be generated; for example a new encryption key may be generated once a certain amount of data has been encrypted with the current key. Note that in this embodiment the new encryption key may be further synchronized with the decryption key generated at the destination device 150. This may be triggered by the decryption of a certain amount of data using the current decryption key, the amount of data which triggers the new decryption key generation being similar to the amount of data which triggers the new encryption key generation. Alternatively a trigger may be sent to destination device 150 from router 120 signalling the need to generate a new decryption key. In yet another alternative, a signal may be sent to a synchronization management entity which may then trigger the generation of a new decryption key at destination device 150, by sending a signal to destination device 150.

In yet another embodiment a synchronization management entity can trigger the production of synchronized encryption and decryption keys at both router 120 and destination device 150 by sending a trigger signal to both router 120 and destination device 150 when a new pair of keys is to be generated.

In yet another embodiment a new encryption key may be generated upon the initiation of any new transmission of data originating from communication device 110. This may apply, for example, when communication device is a customer service terminal or an automated banking machine; when a new customer uses the communication device and initiates a new data transmission session, a new encryption key may be generated. The synchronization of the new encryption key with the generation of a complementary decryption key at destination device 150 may be coordinated by signalling the destination device 150 that a new decryption key is to be generated, either through communication network 130, through a second network, via a synchronization management entity, similar to that described above, or though including information about the data transmission in the unencrypted header of the data transmission. Alternatively, destination device 150 may store a number of past decryption keys, the expected current decryption key and a number of expected future decryption keys. Destination device 150 may attempt to decrypt the encrypted data with a number of the stored decryption keys, including the expected current decryption key and the next expected decryption key.

If a new encryption key is to be generated, it must be decided at step 218 if the new encryption key is to be generated using the original encryption seed 145, or if the new encryption key should be generated using a new encryption seed 145, to be received from encryption seed generator 140. If the new encryption key is generated without receiving a new encryption seed 145, the router returns to step 222, and a new encryption key is generated using the current encryption key as the input to the encryption key generation algorithm; in other words the current encryption key acts as a seed to generate the new encryption key. Alternatively the current encryption key may be combined with the one time password to create a new combined encryption seed to act as a seed to generate the new encryption key.

However, if a new encryption seed 145 is to be received from encryption seed generator 140, the router returns to step 204 to receive the new encryption seed 145. In one embodiment, a new encryption seed 145 is generated periodically, for example every 60 seconds; in this embodiment the router, at step 218, will expect to receive a new encryption seed 145 if the defined period has passed and the current encryption seed 145 is expired or is about to expire. Within this embodiment a synchronization step may occur to ensure that the complementary decryption seed 165 is received at destination device 150. The synchronization step may be similar to the synchronization steps previously described in relation to the synchronization of the encryption and decryption keys. Similarly, other criteria may be used to determine if a new encryption seed is to be received, such as the transmission of a certain amount of data, a trigger from an internal clock or external synchronization entity, or the start of a new data transmission. Synchronization steps for these embodiments are similar to those described above for similar approaches to encryption key/decryption key generation and synchronization.

In embodiments of the present invention, encryption seeds are used to initialize encryption key generation for transmission of data through a network, and the encryption seed used to initialize encryption key generation is changed in a manner that deters malicious and non-authorized users from gaining access to the data. Indeed regularly updating the encryption seed acts as a deterrent to malicious users as, within embodiments of the present invention, the life of an encryption seed is less than the time required to derive or calculate the encryption seed 145, or one of the encryption keys, using electronic methods, using the encrypted data or other information, as a starting point.

Figure 2:
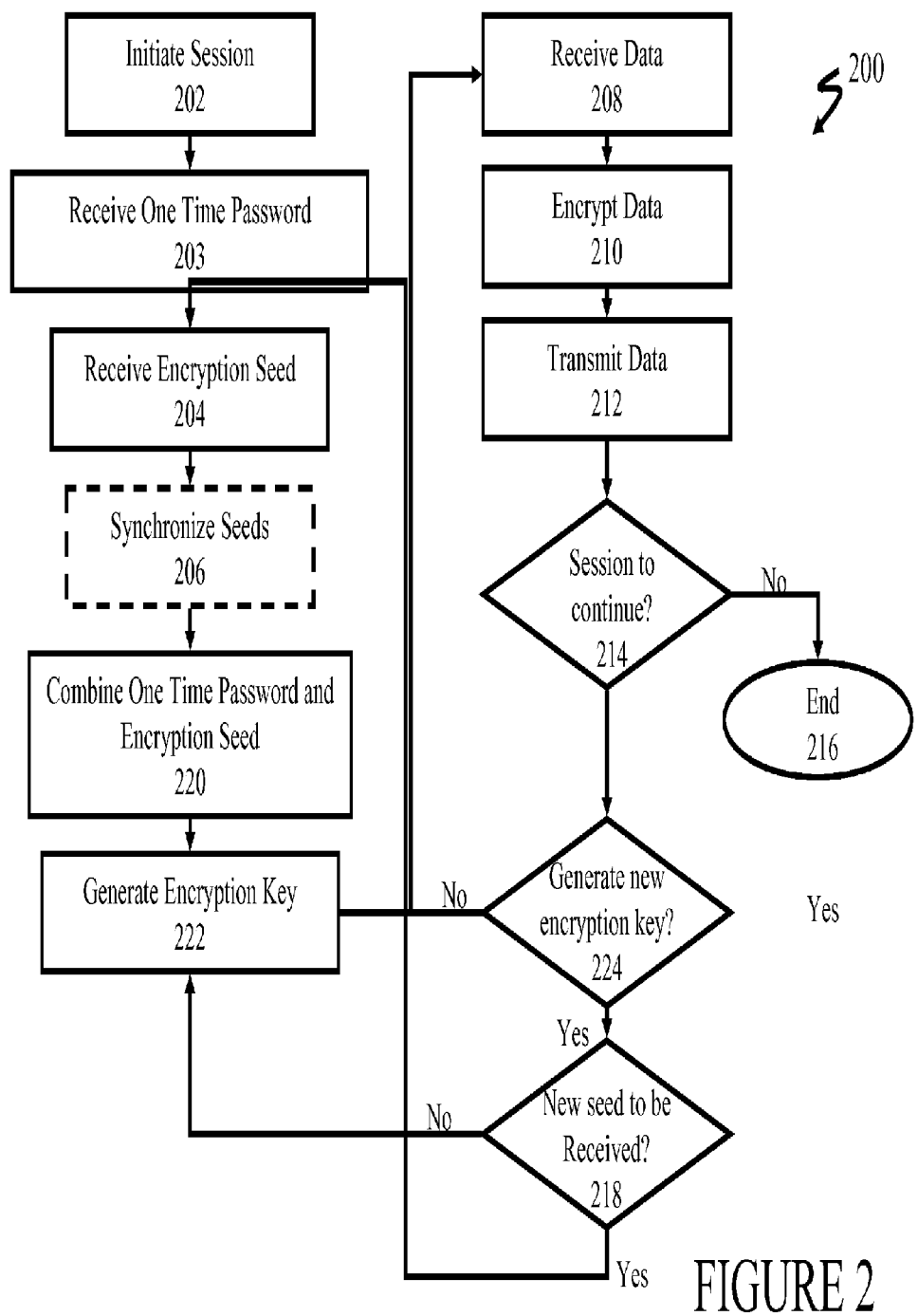
FIG. 2 is a flow chart depicting the steps performed to encrypt data on a network according to one embodiment of the present invention.

Though depicted as following step 224 in FIG. 2, step 218 may occur at any point in method 200, following either step 204, 206, 208, 210, 212, 214, 220, or 222. Indeed triggering of a receipt of a new encryption seed may occur somewhat independently of the order of the steps of method 200, for example occurring at pre-set time intervals, such as every 60 seconds, or alternatively after a pre-set quantity of data has been transmitted, or after each transaction on computing device 110, or a combination of these. Other triggers for receiving a new encryption seed may occur to those of skill in the art.

Further, step 218 may be triggered by a component of system 100 external to the apparatus on which method 200 is being executed, for example an external synchronization entity. Such an entity would be substantially similar to the entity described above with reference to the synchronization of encryption keys, and capable of transmitting a trigger to generate a new encryption key to the router 120 and further capable of transmitting a trigger to generate a new decryption key to the destination device 150. In one embodiment a trigger is sent to both apparatus; in other embodiments a single trigger is sent to a single apparatus, which then further sends a trigger to the second apparatus.

Continuing with the non-limiting example, if method 200 is being executed on router 120, step 218 may be triggered at any point within method 200, including during the execution of steps 204, 206, 208, 210, 212, 214, 220, 222, or 224 when encryption seed generator 140 generates a new encryption seed 145 and sends said encryption seed 145 to router 120.

Figure 3:
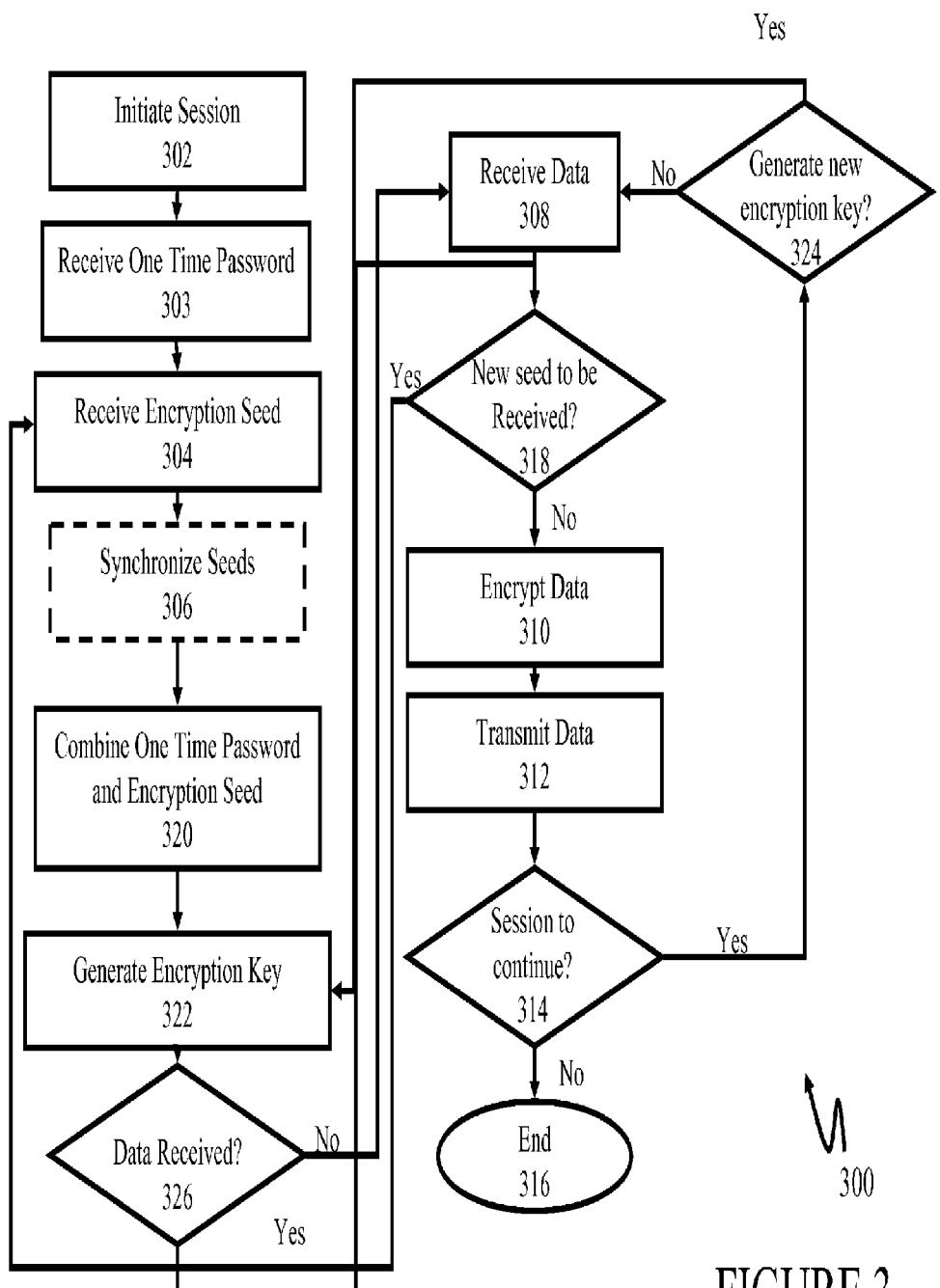
FIG. 3 is a flow chart depicting the steps performed to encrypt data on a network according to one embodiment of the present invention.

As a non-limiting example, FIG. 3 depicts method 300 for encrypting data on a network, according to an alternative embodiment of the present invention. Method 300 is substantially similar to Method 200 depicted in FIG. 2, however the determination if a new encryption seed 145 is to be received from seed generator 140 occurs following the receipt of data, as described in step 208 of Method 200. It should be understood that step 302 of Method 300 corresponds to step 202 of method 200, step 304 corresponds to step 204 and so on.

Within method 300, following encryption key generation step 322, a determination is made if data has already been received at step 326. This is the only additional step that occurs within method 300 that does not correspondingly occur in method 200. If data has not been received, then router 120 receives the data at step 308. If data has been received, a determination if a new seed is to be received occurs at step 318. Similarly, step 318 is executed after receiving data in step 308. The determination of whether or not a new seed is to be received may occur at this point in method 300, either as an integral part of method 300 or, in an alternative embodiment, the insertion of step 318 at this point in method 300 may occur due to an external trigger, such as encryption seed generator 140 transmitting the encryption seed 145 at pre-determined time intervals. If a new encryption seed 145 is to be received, then router 120 returns to step 304 to receive a new encryption seed 145. If a new encryption key 145 is not to be received, the received data is encrypted at step 310, and the encrypted data is transmitted at step 312. At step 314, a determination is made as to whether there is more data to transmit. If so, a determination is made as to whether a new encryption key is to be generated at step 324; if not the session terminates at step 316.

Alternatively, if there is no immediate need to transmit data, the session may not end and router 120 will wait until new data is to be received. In a non-limiting example, this may occur if originating data device 110 is a customer service terminal, where data transmission occurs intermittently, and where a business administering the customer service terminal wishes to reduce latency for a customer using the terminal. In this embodiment, the administrator may wish to initiate a single session which lasts, for example, during the operating hours of the business. In this embodiment the session would not terminate unless such termination is initiated by the administrator.

Returning to FIG. 2, the insertion of the step to determine if a new encryption seed 145 is to be received may similarly occur following the encryption step, depicted as step 210 in method 200. It is understood that additional steps may then be required to determine if encrypted data is to be re-encrypted with a new encryption key generated from the new encryption seed 145 prior to transmission, or if the new encryption seed 145 is to be used only with additional data received. Further synchronization steps may also occur. Similarly the insertion of the step to determine if a new encryption seed 145 is to be received may similarly occur following the transmission step, depicted as step 212 in method 200. It is understood that additional steps may be required to determine if data is to be retransmitted using a new encryption key generated from the new encryption seed 145 prior, or if the new encryption seed 145 is to be used only with additional data received.

In embodiments where the determination of whether a new encryption seed 145 is to be received is triggered by an entity external to the apparatus on which method 200 is occurring, this determination may occur during one of steps 204, 206, 208, 210, 212, 214, 220, 222, or 224. As a non limiting example, encryption seed generator 140 may attempt to send a new encryption seed 145 to router 120, while one of steps 204, 206, 208, 210, 212, 220, 222 or 224 is occurring. In some embodiments the step may be allowed to complete; in other embodiments the step may be interrupted to receive the new encryption seed 145. In the latter embodiment, should the step be interrupted during the encryption step 210, or the transmission step 212, additional steps may occur to determine if the data is to be re-encrypted and/or re-transmitted using a new encryption key generated from the new encryption seed 145. If the external entity triggers the receipt of the new encryption seed 145 during the receiving data step 208, method 200 may be modified to allow the receiving data step 208 and the receive new encryption seed step 204 to be performed in parallel. Alternatively, one step may be completed before the other step occurs. Alternatives may occur to those of skill in the art and are within the scope of the present invention.

In further embodiments the determination to generate a new encryption key step 224, may occur at any point method 200, similar to the determination to generate a new encryption seed step 218. Indeed step 224 may follow, or occur during, steps 204, 206, 208, 210, 212, 214, 218, or 220, and embodiments where either of these alternatives occur are substantially similar to those described with reference to step 218.

Figure 4:
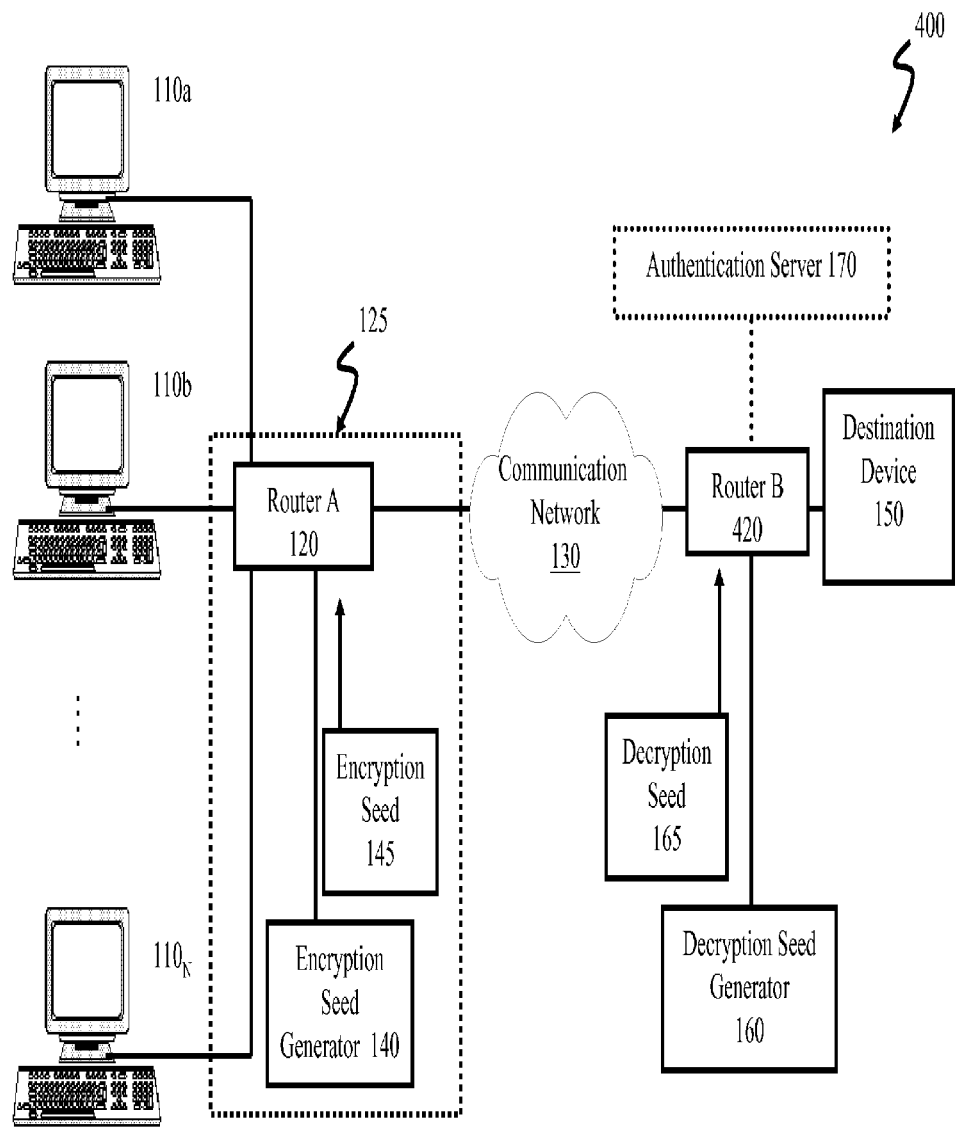
FIG. 4 is a block diagram illustrating a system for encrypting data on a network according to one embodiment of the present invention.

FIG. 4 depicts system 400, an alternative embodiment for encrypting data on a network. System 400 is substantially similar to System 100 depicted in FIG. 1, with similar network elements having similar numbers; in FIG. 4 router 120 from System 100 is labelled router A 120 for clarity. The primary difference between system 100 and system 400 is the addition of router B 420, which couples destination device 150 and decryption seed generator 160 to communication network 130. In this embodiment authentication of originating data device 110, and subsequent decryption of data may occur at router B 420. Alternatively router B 420 may act as a gateway to an authentication server 170, similar to authentication server 170 depicted in FIG. 1b. In yet a further embodiment authentication and decryption may occur at destination device 150 with router 420 acting only as a gateway to destination device 150. In further embodiments authentication server 170, destination device 150 and router B 420 may each authenticate and/or decrypt in a variety of combinations, each being within the scope of the present invention, with a network connection being secured between router A 120 and router B 420.

In an alternative embodiment decryption seed generator 160 may be incorporated into router B 420, destination device 150, or authentication server 170. In yet further embodiments router B 420 may be incorporated into authentication server 420 or destination device 150.

Figure 5:
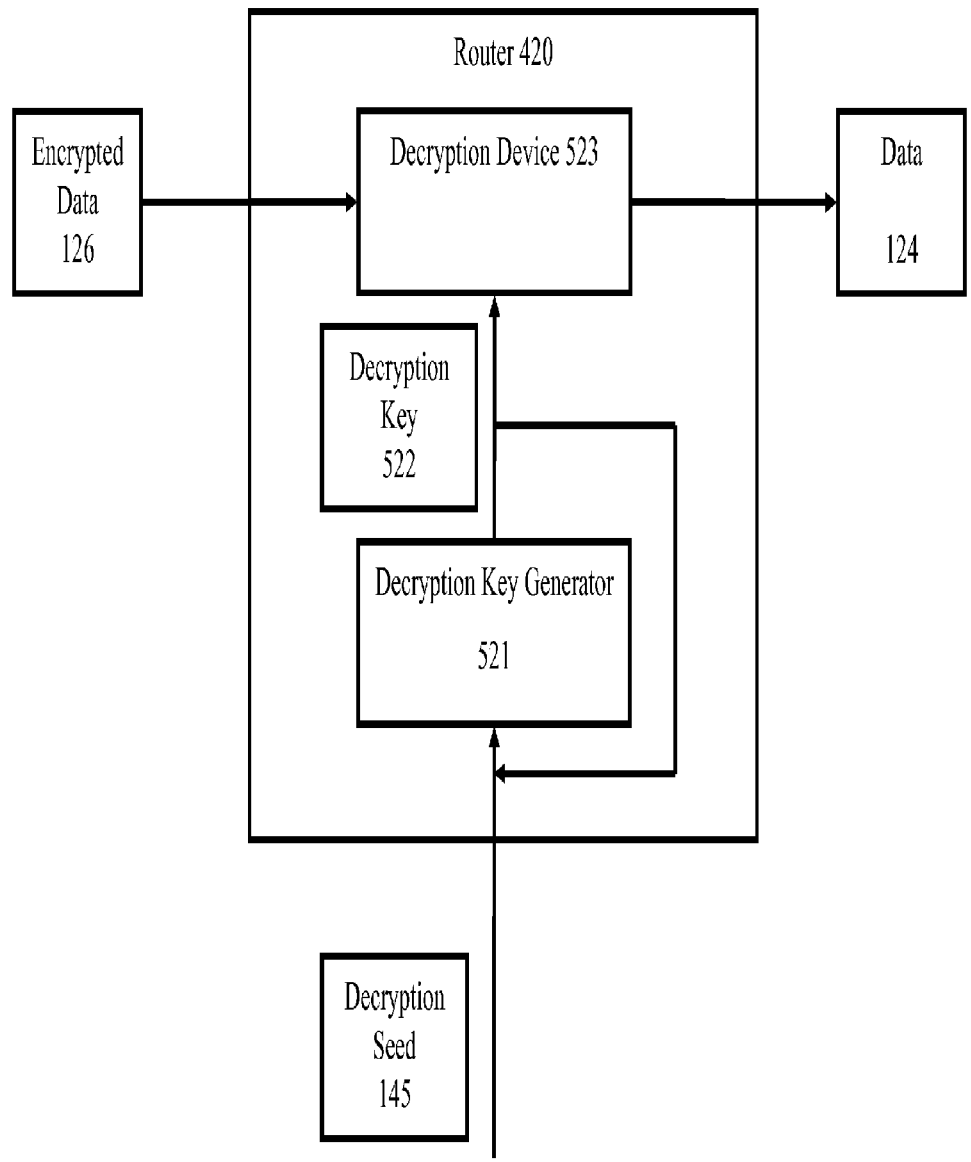
FIG. 5 is block diagram illustrating components of a router deployed in the system for encrypting data on a network according to one embodiment of the present invention.

Details of router B 420, depicted in FIG. 5, are substantially similar to Router A 120 depicted in FIG. 1c. However, Router B 420 contains a decryption key generator 521 to produce a decryption key 522, as well as a decryption device 523 that accepts encrypted data 126 and produces decrypted data 124. The production of decryption keys 522 by decryption key generator 521 is substantially similar to the production of encryption keys 122 by encryption key generator 121.

Router B 420 may also act as a gateway to a secure communication network (not depicted), which is considered a secure communication network by both the users of originating communication device 110 and the users of destination device 150. Within this embodiment data is received at router B 420, decrypted and forwarded on to destination device 150, which is an element of the secure communication network. Indeed Router B 420 may decrypt data for a plurality of destination devices 150 connected to secure communications network 150. In this manner, a single pair of routers, router A 120 and router B 420, may act to securely encrypt and decrypt data transmissions between a plurality of originating communications devices 110 and a plurality of destination devices 150.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

I claim:

1. A method for transmitting encrypted data between a first network element and a second network element, the method comprising:
    acquiring an encryption seed at said first network element, said encryption seed being substantially similar to a decryption seed at the second network element;
    generating at least one encryption key from said encryption seed;
    receiving data;
    encrypting said data using said encryption key to generate encrypted data;
    transmitting said encrypted data from said first network element to said second network element via a network;
    receiving at said first network element a synchronization signal transmitted from a synchronization management entity to both said first network element and said second network element;
    acquiring a synchronized encryption seed in response to the received synchronization signal;
    updating said encryption seed at said first network element with the acquired synchronized encryption seed; and
    generating a new encryption key for use in encrypting data based on the synchronized encryption seed wherein a period between receiving said synchronization signal and receiving a second synchronization signal is less than the period required to derive one of said encryption seed and said at least one encryption key from said encrypted data, and
    wherein the synchronization management entity is a separate entity from the first network element and the second network element.

2. The method of claim 1 wherein the synchronization signal is transmitted in response to an event trigger.

3. The method of claim 2 wherein said event trigger is at least one of:
    receipt of a defined quantity of said data;
    transmission of a defined quantity of said data;
    expiration of a defined period time; and
    occurance of an external event.

4. The method of claim 1,
    wherein a plurality of synchronization triggers are received and new encryption keys generated during a single data session.

5. The method of claim 1, further comprising:
    receiving said synchronization signal at said second network element;
    retrieving a synchronized decryption seed corresponding to the synchronized encryption seed in response to the received synchronization signal;
    generating a new decryption key corresponding to the new encryption key for use in decrypting encrypted data.

6. The method of claim 5, further comprising verifying synchronization of the new encryption key of the first network element and the new decryption key at the second network element.

7. The method of claim 6, wherein verifying synchronization comprises:
    sending a test message encrypted using the new encryption key from the first network element to the second network element;
    decrypting the test message using the new decryption key.

8. A system for transmitting encrypted data comprising:
    a synchronization management entity enabled to transmit a synchronization signal;
    a first network element enable to:
        acquire an encryption seed substantially similar to a decryption seed at a second network element;
        generate at least one encryption key from said encryption seed;
        receive data;
        encrypt said data using said encryption key to generate encrypted data;
        transmit said encrypted data from said first network element to said second network element via a network;
        receive the synchronization signal transmitted from the synchronization management entity to both the first network element and the second network element;
        acquire a synchronized encryption seed in response to the received synchronization signal;
        update said encryption seed at said first network element with the acquired synchronized encryption seed; and
        generate a new encryption key for use in encrypting data based on the synchronized encryption seed,
    wherein a period between receiving said synchronization signal and receiving a second synchronization signal is less than the period required to derive one of said encryption seed and said at least one encryption key from said encrypted data, and
    wherein the synchronization management entity is a separate entity from the first network element and the second network element.

9. The system of claim 8 wherein the synchronization signal is transmitted in response to an event trigger.

10. The system of claim 9 wherein said event trigger is at least one of
receipt of a defined quantity of said data;
transmission of a defined quantity of said data;
expiration of a defined period time; and
occurrence of an external event.

11. The system of claim 8, wherein a plurality of synchronization triggers are received and new encryption keys generated during a single data session.

12. The system of claim 8, further comprising:
the second network element, which is enabled to:
receive said synchronization signal at said second network element;
retrieve a synchronized decryption seed corresponding to the synchronized encryption seed in response to the received synchronization signal;
generate a new decryption key corresponding to the new encryption key for use in decrypting encrypted data.

13. The system of claim 12, wherein the second network element is further enabled to verify synchronization of the new encryption key of the first network element and the new decryption key at the second network element.

14. The system of claim 13, wherein verifying synchronization comprises:
sending a test message encrypted using the new encryption key from the first network element to the second network element;
decrypting the test message using the new decryption key.

* * * * *

UNITED STATES PATENT AND TRADEMARK OFFICE
CERTIFICATE OF CORRECTION

| | |
|---|---|
| PATENT NO. | : 9,350,713 B2 |
| APPLICATION NO. | : 14/063655 |
| DATED | : May 24, 2016 |
| INVENTOR(S) | : Doughan Turk |

It is certified that error appears in the above-identified patent and that said Letters Patent is hereby corrected as shown below:

Title page, Col. 1, should include Foreign Application Priority Data as follows:
--- Foreign Application Priority Data, December 23, 2005 (CA) 2531411 ---

Signed and Sealed this
Fifth Day of July, 2016

Michelle K. Lee
*Director of the United States Patent and Trademark Office*